United States Patent [19]
Vedova

[11] 3,820,746
[45] June 28, 1974

[54] LIFT ENGINE ARRANGEMENT

[75] Inventor: Ralph Vedova, Munich, Germany

[73] Assignee: Motoren Turbinen-Union Munchen GmbH, Munich, Germany

[22] Filed: Sept. 24, 1971

[21] Appl. No.: 183,379

[30] Foreign Application Priority Data
Sept. 29, 1970  Germany............................ 2047782

[52] U.S. Cl. .............. 244/55, 244/23 B, 244/12 B, 60/226 R
[51] Int. Cl. ........................................... B64d 27/12
[58] Field of Search ............ 244/55, 53 R, 53 B, 54, 244/58, 60, 12 B, 23 A, 23 B, 23 C; 60/226 R, 39.31, 262

[56] References Cited
UNITED STATES PATENTS

| | | | |
|---|---|---|---|
| 2,973,166 | 2/1961 | Stahmer | 60/226 R |
| 2,978,205 | 4/1961 | David | 244/23 B |
| 3,161,374 | 12/1964 | Allred et al. | 60/226 R |
| 3,448,945 | 6/1969 | Ascani, Jr. | 244/54 |
| 3,618,875 | 11/1971 | Kappus | 244/23 B |
| 3,638,884 | 2/1972 | Timperman | 244/12 B |
| 3,645,476 | 2/1972 | Haberkorn | 244/55 X |
| 3,680,316 | 8/1972 | Pakendorf | 244/54 X |

*Primary Examiner*—George E. A. Halvosa
*Assistant Examiner*—Edward R. Kazenske
*Attorney, Agent, or Firm*—Craig and Antonelli

[57] ABSTRACT

A lift engine assembly arrangement for installation in a predetermined geometrical installation area of an aircraft having a circular lift fan and at least one power unit for driving the lift fan positioned within the geometrical installation area.

37 Claims, 6 Drawing Figures

PATENTED JUN 28 1974　　　　　　　　　3,820,746

INVENTOR
RALPH VEDOVA

BY Craig, Antonelli & Hill

ATTORNEYS

LIFT ENGINE ARRANGEMENT

The present invention relates to the configuration and arrangement of one or more pancake lift engines in VTOL aircraft, each lift engine comprising at least one independent power unit to drive the associated lift fan.

A known type of aircraft lift fan is disclosed in German Patent 1092311 wherein the lift fan is fitted with a circumferentially extending row of turbine blades for driving the fan by power from the hot gases expended by the actual cruise or propulsion engine and drawn through suitable ducting. This particular arrangement is therefore wholly reliant on the action of the cruise engine, and requires extensive hot-gas ducting and associated flow control apparatus with the attendant weight and space problems. In addition, the dependency of the lift fan on the cruise engine for its sole source of power detracts from the safety of the aircraft in flight, and it can also be appreciated that this arrangement entails considerable deadweight.

Other known arrangements utilize axial-flow bypass engines for producing VTOL lift thrust. Lift engines such as these are commonly constructed in a twin-spool arrangement in which a low-pressure fan stage discharges a portion of its air pressure into the internal gas generator and contributes the remaining portion to the generation of the required lift thrust. This type of engine provides a thrust weight ratio on the order of 16:1 to 20:1 if not greater. Such ratios are achieved by incorporating lightweight metals and, especially, fiber-reinforced plastics as structural materials in, for example, casing components, in the low-pressure fan stage and in the firt stages in the high-pressure compressor. Use is also made of improved temperature-resistant materials and special blade cooling provisions in the hot-gas area. However, the primary disadvantage of this type of lift engine is its large axial size which prevents the installation in flat aircraft spaces, such as in the wing, and confines the installation to the fuselage or externally carried nacelles.

In lift engines having a lift fan and a central gas generating section, the requirement for maximum flatness in construction compels the exclusive or partial use of an essentially radial-flow compressor and/or turbine stages. However, the problems in transferring hot gases from the central generating section past the fan blades and to the tip turbine blades are numerous. In addition, the central disposition of the gas generator in such a lift engine will limit the freedom required in lift fan design and limit the ease of maintainance characteristics of the entire power system.

The above-described lift fans having a circumferential tip turbine arrangement to form an independent lift fan engine, or a lift fan externally driven by a cruise engine inside the fuselage as disclosed in German Patent 1092311 require a circular area for installation, as in the wing, to accommodate its essentially circular contour. As a result, a portion of the available space surrounding one or several lift engines, or lift fans, is generally not fully utilized for maximum lift engine performance. This is exemplified by the fact that the maximum circular area (basic area of lift fan or engine) to fit inside a square will generally not cover more than approximately 78.5 percent of the square.

It is therefore an object of the present invention to eliminate the disadvantages of the above-described arrangements by providing a lift engine arrangement of extremely flat construction to give maximum lift and/or thrust and an optimum thrust weight ratio within a minimum installation area such that the space available to accommodate one or several lift engines, as in a wing, is optimally utilized for lift. It is another object of this invention to provide a lift engine arrangement having maximum compatibility with the requirements for engine installation in aircraft and for high performance aircraft design while promoting ease of maintenance and a high degree of safety in flight.

It is a further object of the present invention to provide a lift engine assembly in which the geometric space not utilized around the lift fan due to its circular installation area is utilized for accommodating such power units or auxiliary drives as may be desired to form a lift engine assembly occupying any preferred geometric area in accordance with the available space.

These disadvantages are eliminated according to the present invention wherein a lift engine assembly is formed by selectively disposing power units and auxiliary drives around a lift fan so that the space available for the lift engine assembly installation is optimally utilized for maximum concentration of performance.

In accordance with one feature of the invention, any type of power unit may be utilized for driving the lift fan, for example, a combustion engine, a gas turbine engine, a rocket engine, or the like. In addition, any arrangement for transferring power from the power units to the lift fan may be utilized. For example, the power transfer may be achieved by means of fitting tip turbine blades to the lift fan for absorbing energy from the exhaust gases of a gas turbine engine or from a portion of the air pressure discharged by a compressor in that engine, or by mechanical transmission through toothed gearing and shafting.

In accordance with another feature of this invention, the installation space to be occupied by a lift engine can be any desired geometric area such as square, rhombic, triangular or elliptical, with the power units being selectively disposed in the unoccupied sections of the available installation area around a lift fan.

In accordance with a further feature of the present invention, a plurality of lift engines each occupying alike installation areas are formed into a coherent self-sufficient power system covering any desirable area compatible with the available overall installation space. Characteristically, the number of lift engines installed can be added in building block fashion to give the desired concentration of performance.

It is a still further object of the present invention to provide an engine assembly in which for ease of maintenance, the power units driving a lift fan or the lift engines are complete, separately operable and replaceable entities.

These and other objects, features and advantages of the present invention will become more obvious from the following description when taken in connection with the accompanying drawings, wherein.

Figure 1:
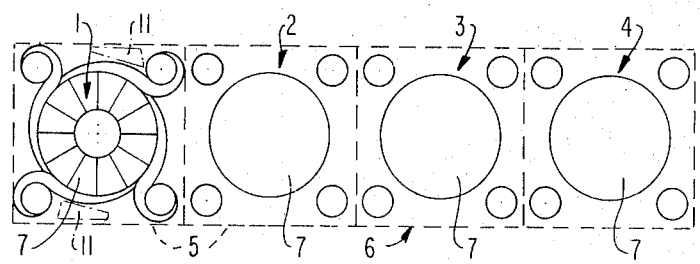
FIG. 1 is a plan view and illustrates an embodiment of the lift engine assembly according to the present invention and a plural engine configuration therefor.

Referring now to the drawings wherein like reference numerals are used throughout the various views to designate like parts and more particularly to FIG. 1, there is provided, in accordance with the present invention, a plurality of lift engines 1, 2, 3 and 4, each requiring a square installation area 5, shown in dashed line, which engines can be arranged to form a rectangular configuration 6, also shown in dashed line. It is readily apparent that due to the square installation area of each of engines 1, 2, 3 and 4, the engines could be arranged to also provide a square configuration.

Figure 4:
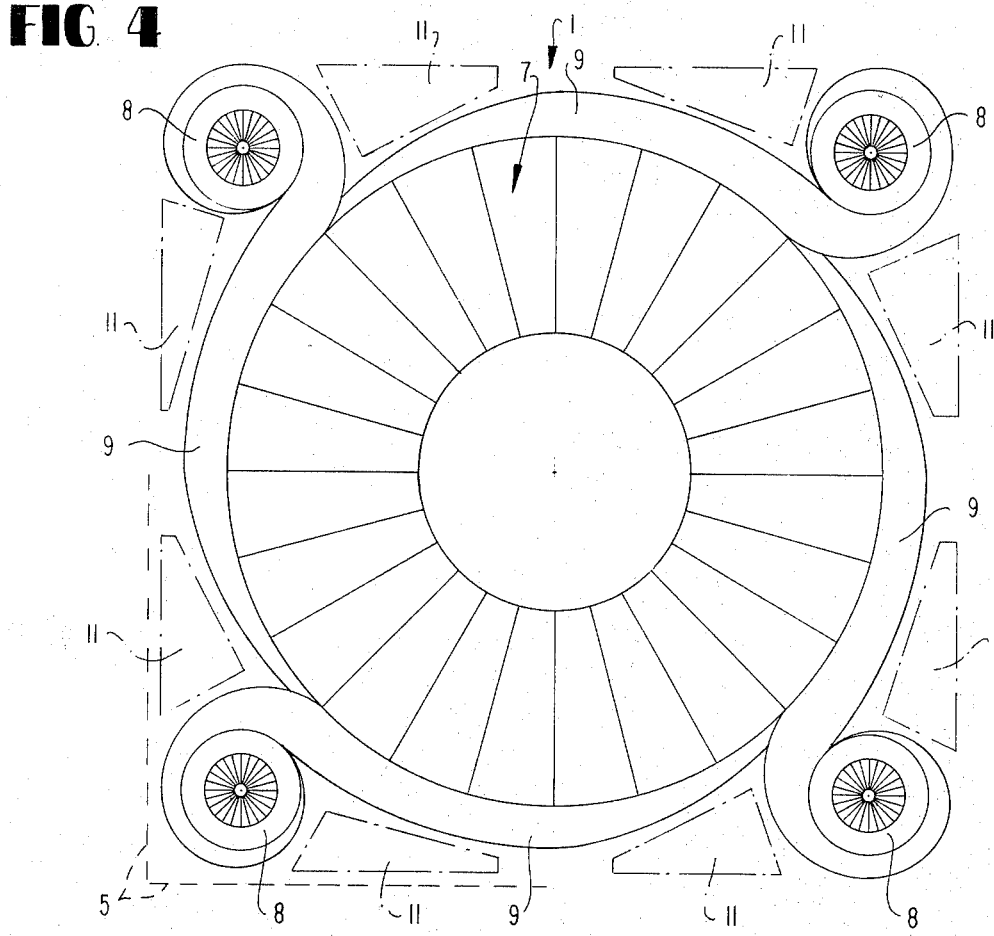
FIG. 4 is an enlarged plan view of the lift engine assembly of FIG. 1.
Figure 5:
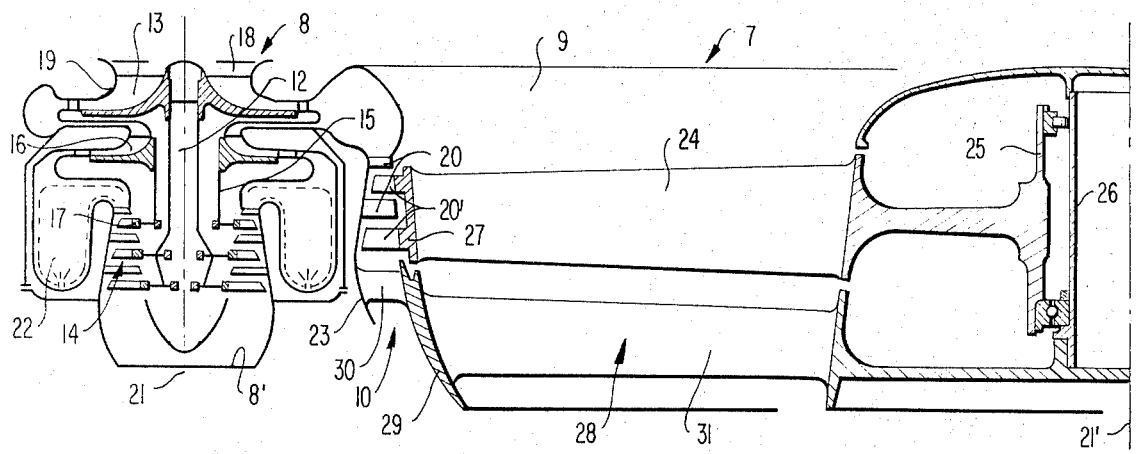
FIG. 5 is a detailed schematic sectional view illustrating a gas turbine engine for powering a lift fan with the right half of the lift engine broken away for clarity.

As shown in FIG. 4, which is an enlarged plan view of engine assembly of FIG. 1, the engine assembly includes a large diameter central lift fan 7 jointly driven by, for example, four equidistant power units 8 such as alike gas turbine engines which supply tip turbine 10 of lift fan 7, shown in FIG. 5, with air under pressure channeled through spiral inlet ducts 9. The space not occupied within the installation square 5 by fan 7 and gas turbine engines 8 can be utilized to accommodate auxiliary drives 11, shown in dashed line, such as pumps or actuating cylinders for servicing the gas turbine engines 8 or air motors for opening or closing doors over the lift fan inlet or outlet openings in the aircraft wing. Additionally, the unoccupied space around fan 7 can be at least partially utilized for housing fuel or oil tanks.

Referring to FIG. 5, each gas turbine 8 is shown as a twin-spool arrangement with an inner shaft 12 having a radial-flow low-pressure fan wheel 13 and downstream therefrom, a two-stage axial-flow low-pressure turbine 14 to drive low-pressure fan wheel 13 seated thereon. The gas turbine engine 8 also includes a hollow shaft 15 coaxial with inner shaft 12 which carries radial-flow high-pressure fan wheel 16 downstream of low-pressure fan wheel 13. Also attached to the hollow shaft 15 is an axial-flow high-pressure turbine wheel 17 driving high-pressure fan wheel 16.

In operation, the low-pressure fan wheel 13 draws in outside air through an intake 18 in a compressor casing 19 and discharges air under pressure to the lift fan 7 through the spiral inlet duct 9. The air issuing from duct 9 impinges on guide vanes 20 and rotor blades 20' of the tip turbine 10 which forms a part of the lift fan 7. A portion of the air discharged by the low-pressure fan wheel 13 is not exhausted to the tip turbine 10 through inlet duct 9, but is passed for further compression through high-pressure fan wheel 16, and into a reverse-flow combustion chamber 22 which extends in line with the longitudinal centerline 21 of the gas turbine engine 8. In the reverse-flow combustion chamber 22, fuel is added to the compressed air and the resultant mixture is then burned to drive high-pressure turbine 17 and low-pressure turbine 14, in that order. Thus, the gas turbine engine shown in FIG. 5 simultaneously produces lift and thrust, and includes an arrangement for permitting the engine exhaust gases to exit vertically downward through an outlet 8'. The exhaust gases can also be utilized for pressurizing tip turbine 10 associated with the lift fan 7. As shown in the drawings, lift fan 7 essentially comprises fan blades 24, which are rotatably mounted inside shroud 23 with rotary blades 20' of the tip turbine 10 being arranged at the tips of the blades 24. The fan blades 24 are journaled about trunnion 26 through a hollow shaft 25. The airflow through the tip turbine 10 is separated from the portion through lift fan 7 by webs 27 between fan blades 24 and turbine blades 20'. The fan blades 24 draw in outside air and discharge the air into an annular duct 28 formed by a cylindrical casing 29 which extends downward from the webs 27 as a continued partition between the respective airflows through tip turbine 10 and lift fan 7. Both the tip turbine 10 and the lift fan 7 are provided with guide vanes 30 and 31, repectively, which also serve as structural support members.

Figure 2:
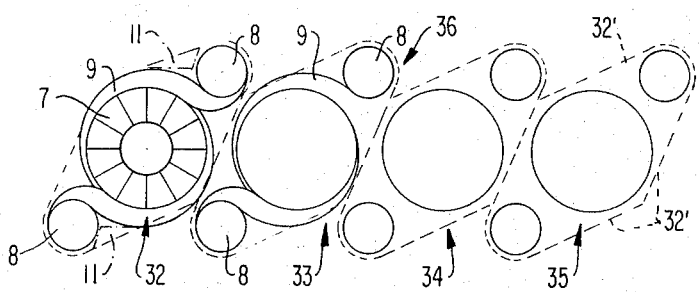
FIG. 2 is a plan view and illustrates an alterantive embodiment of the lift engines and a plural engine configuration therefor in constallation.
Figure 3:
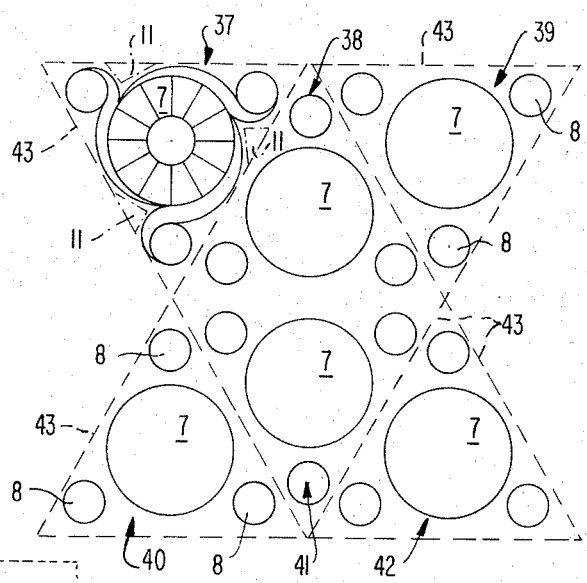
FIG. 3 is a plan view and illustrates another alternative embodiment of the lift engines and a plural engine configuration therefor.

Referring to FIGS. 2 and 3, these figures disclose other lift engine assembly arrangements in accordance with the present invention. Thus, FIG. 2 discloses a lozenge-shaped arrangement for lift engines 32, 33, 34 and 35 forming a group configuration 36. However, unlike the lift engine of FIG. 1, there are only two power units 8 at the circumference of each lift fan 7, whereas the transverse distances between gas turbine engines 8 of the lift engine in both figures are the same. In FIG. 3, each of the lift engine assemblies 37, 38, 39, 40, 41 and 42 is provided with a triangular installation area 43 to form an approximately X-shaped grouping configuration. The lift engines having a triangular installation area 43 can of course be added where required depending upon available space. It is readily apparent that the operation of the lift engines of FIGS. 2 and 3 is similar to the lift engine of FIG. 5.

The various described embodiments of the present invention show that for any given lift engine installation area, gas turbine engines 8 are disposed around lift fan 7 in accordance with the specific space requirements. Accordingly, one consideration underlying this invention is that a lift fan in an aircraft wing normally requires a circular installation area and does not utilize a substantial portion of the area adjacent to the circle, which is then lost in terms of performance and thrust weight ratio. Therefore, the embodiments of FIGS. 1 through 4 are suggestive of different arrangements to provide optimum utilization of available installation area, as in the wings of an aircraft. It should also be noted that the grouped configurations contemplated in FIGS. 1 through 4 may take other forms, for example, the installation areas of lift engines can also be made elliptical or rhombic to provide any desired geometric configuration.

It is therefore apparent that in accordance with the present invention, any lift engine configuration utilized permits a building block system design in that lift power is increased by adding to present lift engines as suits the particular lift/thrust requirements and as is compatible with the available installation space. In addition, a damaged lift engine assembly can be replaced as a unit. Also as shown in the arrangement of FIG. 5, it would be practical to remove and replace a single gas turbine engine 8, if damaged, without disturbing lift fan 7 from its installed position. This is achieved by the structural arrangement of the present invention of disposing power units 8 as fully self-sufficient units at the circumference of the lift fan 7.

It should be noted that in the lift engine assembly of FIG. 5, the exhaust gases from the power units 8 can also be used to pressurize tip turbine 10 associated with each lift fan 7.

It should be noted that in the engine assemblies of FIGS. 1-5, reference numeral 8 has been designated as a "power unit" in order to indicate that the present invention is not limited to the exclusive utilization of gas turbine engines as shown in FIG. 5 for impelling lift fans 7. Thus, the power units 8 of FIGS. 1-4 may be constituted by any desired type of combustion engine capable of generating impellent flow for energizing tip turbine 10 associated with each lift fan 7.

Figure 6:
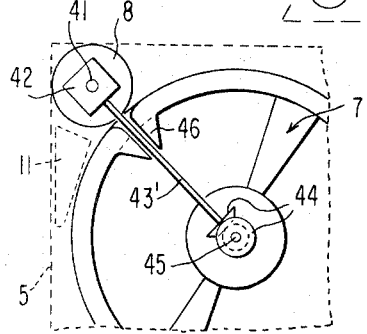
FIG. 6 is a partial plan view of a mechanical transmission arrangement for powering the lift fan.

The transfer of power may be achieved by means of hot gases or compressed air impinging on tip turbine 7 or may be achieved by mechanical transmission via toothed gearing and shafting between power units 8 and lift fans 7. As shown in FIG. 6, the lift fan 7 is driven by the power unit 8 via a mechanical transmission including a drive shaft 41 coupled to a transmission shaft 43' via a reduction gear 42. The transmission shaft is mounted in a bearing 46 and is coupled to a fan shaft 45 via bevel gears 44. The power units 8 of FIGS. 1-4 may also be in the form of chemical reaction power systems such as rocket engines, or combined air-breathing rocket and/or gas turbine systems.

It is thus apparent that in carrying out the features of the present invention, the dominant tendency will be to maximize the direct transmission of energy from power units 8 to their associated lift fans 7. In accordance with such an arrangement, the present invention includes the disposition of power units 8 relative to lift fans 7 in positions other than the vertical, as in a wing. For optimum utilization of the space around lift fan 7, power units 8 may be slanted with respect to the lift fan longitudinal centerline 21' shown in FIG. 5 or the longitudinal axes of the power units may extend perpendicularly to the longitudinal axis 21' of a lift fan 7, since it is not necessary that the power units 8 serve the dual function as shown in FIG. 5 of generating vertical thrust when the lift and/or thrust requirements are satisfied by lift fans 7 alone.

Obviously many modifications and variations of the present invention are possible in the light of the above teachings. It should therefore be understood that within the scope of the appended claims, the invention may be practiced otherwise than as specifically described.

I claim:

1. A lift engine arrangement for an aircraft comprising at least one circular lift fan and a plurality of independently operable power units for driving each of said at least one lift fans, said power units being arranged at the circumference of the respective lift fan, wherein said plurality of independent power units for each lift fan are equally spaced about the axis of rotation of the lift fan being driven thereby, wherein each of said lift fans is provided with a tip turbine, wherein each of said power units is constructed as a gas turbine engine for generating an air stream to drive one of said respective tip turbines, and wherein said air stream is transmitted to said tip turbines from respective compressors of said gas turbine engines which are arranged upstream of respective conbustion chambers of said gas turbine engines.

2. An arrangement according to claim 1, wherein said lift engine arrangement is within a wing of an aircraft, and wherein the axial extent of said lift engine arrangement is no greater than the height of the adjacent airfoil of the wing.

3. A lift engine arrangement for an aircraft comprising a plurality of lift engines positioned in side-by-side relationship, each of said lift engines including a lift fan having a circular outline and at least one power unit at the circumference of said lift fan for driving said lift fan, said at least one power unit being positioned within unoccupied geometrical installation areas between adjacent ones of said lift fans, whereby the open space inherently formed between the adjacent circular shaped fans is effectively used as said geometrical installation in areas for the respective at least one power unit for each lift fan, wherein each of said lift fans is provided with a tip turbine, wherein each of said power units is constructed as a gas turbine engine for generating an air stream to drive one of said respective tip turbines, and wherein said air stream is transmitted to said tip turbines from respective compressors of said gas turbine engines which are arranged upstream of respective combustion chambers of said gas turbine engines.

4. An arrangement according to claim 3, wherein a spiral inlet duct is provided for transmitting said airstream to said tip turbines.

5. An arrangement according to claim 3, wherein each of said gas turbine engines is separately operable and replaceable with respect to other of said gas turbine engines.

6. An arrangement according to claim 3, wherein said lift engine arrangement is within a wing of an aircraft, and wherein the axial extent of said lift engine arrangement is no greater than the height of the adjacent airfoil of the wing.

7. An arrangement according to claim 3, wherein the respective rotational axes of said gas turbine engines forming said power units extend parallel to the respective axes of rotation of said lift fans.

8. An arrangement according to claim 7, wherein each of sais gas turbine engines is separately operable and replaceable with respect to other of said gas turbine engines.

9. A lift engine arrangement for an aircraft comprising at least one circular lift fan and at least three independently operable power units for driving each of said at least one lift fans, said power units being arranged at the circumference of the respective lift fan being driven thereby in an equally spaced arrangement about the axis of rotation of the lift fan being driven thereby.

10. An arrangement according to claim 9, wherein four power units are provided for each of said at least one circular lift fans, said four power units being disposed in respective corners of a square enclosing the respective lift fan.

11. An arrangement according to claim 9, wherein three power units are provided for each of said at least one circular lift fan, said three power units being disposed in respective corners of an equilateral triangle enclosing said lift fan.

12. An arrangement according to claim 9, wherein said lift engine arrangement is within a wing of an aircraft, and wherein the axial extent of said lift engine arrangement is no greater than the height of the adjacent airfoil of the wing.

13. An arrangement according to claim 9, further comprising auxiliary drive means positioned intermediate said at least one lift fan and said power units.

14. An arrangement according to claim 9, wherein a plurality of similar lift fans and associated power units are provided in side-by-side relationship.

15. An arrangement according to claim 14, further comprising auxiliary drive means positioned in unoccupied geometrical areas between said lift fans and associated power units.

16. An arrangement according to claim 9, further comprising mechanical transmission means connected between each of said power units and the associated lift fan for driving said lift fan.

17. An arrangement according to claim 16, wherein said mechanical transmission means includes a transmission shaft coupled to a respective power unit by a reduction gear and coupled to a respective lift fan by bevel gears.

18. An arrangement according to claim 9, wherein each of said lift fans is provided with a tip turbine, and wherein each of said power units is constructed as a gas turbine engine for generating an air stream to drive one of said respective tip turbines.

19. An arrangement according to claim 18, wherein the respective rotational axes of said gas turbine engines forming said power units extend parallel to the respective axes of rotation of said lift fans.

20. An arrangement according to claim 19, wherein each of said gas turbine engines is separately operable and replaceable with respect to other of said gas turbine engines.

21. A lift engine arrangement for an aircraft comprising a plurality of lift engines positioned in side-by-side relationship, each of said lift engines including a lift fan having a circular outline and a plurality of power units at the circumference of said lift fan for driving said lift fan, said power units being positioned within otherwise unoccupied geometrical installation areas between adjacent ones of said lift fans, each of said lift fans having an axis of rotation, the power units for each fan being spaced equally about the axis of rotation of the respective fan being driven thereby, wherein the installation area for a respective lift fan and associated power units is bounded by a polygon having at least two sides of equal length, the respective sides of said polygon being formed by one of lines approximating tangents to the circular shaped lift fan and lines approximating tangents to the periphery of the power units for driving said lift fan, whereby the open space inherently formed between the adjacent circular shaped fans is effectively used as said geometrical installation areas for the respective power units.

22. An arrangement according to claim 21, further comprising auxiliary drive means positioned in portions of said unoccupied geometrical installation areas not occupied by said power units.

23. An arrangement according to claim 21, wherein each of said power units is separately operable and replaceable with respect to other of said power units.

24. An arrangement according to claim 21, wherein four power units are provided for each lift fan, and wherein said polygon is a square.

25. An arrangement according to claim 21, wherein two power units are provided for each lift fan, and wherein said polygon is rhombic shaped.

26. An arrangement according to claim 21, wherein three power units are provided for each lift fan, and wherein said polygon is triangular.

27. An arrangement according to claim 21, wherein each of said lift engines is disposed in a similar shaped polygon in side-by-side relationship to the polygons of adjacent lift engines.

28. An arrangement according to claim 21, wherein each of said lift fans is provided with a tip turbine, and wherein each of said power units is constructed as a gas turbine engine for generating an air stream to drive one of said respective tip turbines.

29. An arrangement according to claim 21, wherein said lift engine arrangement is within a wing of an aircraft, and wherein the axial extent of said lift engine arrangement is no greater than the height of the adjacent airfoil of the wing.

30. An arrangement according to claim 21, further comprising mechanical transmission means connected between each of said power units and the associated lift fan for driving said lift fan.

31. An arrangement according to claim 30, wherein said mechanical transmission means includes a transmission shaft coupled to a respective power unit by a reduction gear and coupled to a respective lift fan by bevel gears.

32. An arrangement according to claim 21, wherein each of said power units includes rotatable means which rotate about a respective power unit axis, wherein each of said lift fans are rotatable about a respective lift fan axis, and wherein, for each lift engine, the power unit axes extend parallel to the lift fan axis.

33. An arrangement according to claim 32, wherein all lift fan axes and power unit axes extend parallely to one another.

34. An arrangement according to claim 32, wherein each of said power units is separately operable and replaceable with respect to other of said power units.

35. An arrangement according to claim 21, wherein each of said lift fans is provided with a tip turbine, and wherein each of said power units is constructed as a gas turbine engine for generating an air stream to drive one of said respective tip turbines.

36. An arrangement according to claim 35, wherein the respective rotational axes of said gas turbine engines forming said power units extend parallel to the respective axes of rotation of said lift fans.

37. An arrangement according to claim 36, wherein each of said gas turbine engines is separately operable and replaceable with respect to other of said gas turbine engines.

* * * * *